United States Patent
Casiez et al.

(10) Patent No.: US 10,712,865 B2
(45) Date of Patent: Jul. 14, 2020

(54) PREDICTIVE DISPLAY DEVICE

(71) Applicants: Inria Institut National De Recherche En Informatique Et En Automatique, Le Chesnay (FR); UNIVERSITÉ DE LILLE, Villeneuve d'Ascq (FR)

(72) Inventors: Géry Casiez, Roost Warendin (FR); Denis Efimov, La Madeleine (FR); Rosane Ushirobira, Villeneuve d' Ascq (FR); Stanislav Aranovskiy, Rennes (FR); Nicolas Roussel, Villeneuve d' Ascq (FR)

(73) Assignees: Université De Lille (FR); Inria Institut National De Recherche En Informatique Et En Automatique, Le Chesnay (FR)

(*) Notice: Subject to any disclaimer, the term of this patent is extended or adjusted under 35 U.S.C. 154(b) by 0 days.

(21) Appl. No.: 16/335,040

(22) PCT Filed: Sep. 19, 2017

(86) PCT No.: PCT/FR2017/052508
§ 371 (c)(1),
(2) Date: Mar. 20, 2019

(87) PCT Pub. No.: WO2018/055280
PCT Pub. Date: Mar. 29, 2018

(65) Prior Publication Data
US 2019/0278456 A1  Sep. 12, 2019

(30) Foreign Application Priority Data
Sep. 20, 2016 (FR) .................................. 16 58833

(51) Int. Cl.
*G06F 3/041* (2006.01)
*G06F 9/451* (2018.01)
(Continued)

(52) U.S. Cl.
CPC .......... *G06F 3/04166* (2019.05); *G06F 3/038* (2013.01); *G06F 3/0416* (2013.01); *G06F 9/451* (2018.02); *G06F 11/3485* (2013.01)

(58) Field of Classification Search
CPC ...... G06F 3/04166; G06F 3/038; G06F 9/451; G06F 3/0416; G06F 11/3485
See application file for complete search history.

(56) References Cited

U.S. PATENT DOCUMENTS

2014/0035827 A1  2/2014  Hyde et al.
2017/0007113 A1*  1/2017  Imamura .............. A61B 3/0025

* cited by examiner

*Primary Examiner* — Muhammad N Edun
(74) *Attorney, Agent, or Firm* — Maynard, Cooper & Gale, P.C.; Brian Sattizahn

(57) ABSTRACT

A computerized device having a man-machine input interface, a controller and a display. The controller being arranged to control the display according to a control value measured on the man-machine input interface at a first measuring frequency. The controller having a derivator and is arranged, between a first moment and a second moment separated by a duration based on the first measuring frequency, for: calling on the derivator to calculate an estimate of the derivative of the control value at the second moment from the control value at the first moment and the duration based on the first frequency; calculating a smoothing factor value at the second moment from the estimate of the first derivative of the control value at the second moment and from a smoothing factor value at the first moment; calculating a display value from the control value at the first moment and from a value based on the estimate of the derivative of the control value at the second moment and of the smoothing factor value at the second moment; and controlling the display with the display value.

10 Claims, 1 Drawing Sheet

(51) Int. Cl.
*G06F 11/34* (2006.01)
*G06F 3/038* (2013.01)

PREDICTIVE DISPLAY DEVICE

BACKGROUND OF THE INVENTION

The invention relates to the field of human-computer interaction and more specifically to managing the latency of the display of a user input.

The advent of resistive then capacitive technology as a user input interface and their integration into screens has revolutionized uses.

The sense of touch and its coordination with sight are so instinctive that laptops have been joined in use by mobile phones and tablets.

These new uses pose the problem of managing latency. Indeed, between the latency of the interface, that of the operating system processing this input, that of the application that uses it and displays it, the time between a movement of one or more fingers on the screen and displaying the resulting action is often more than 50 ms.

But latency is perceived by most users from 20 ms, and is bothersome from 25 ms in the case of touch interfaces. And the more the adoption of these technologies progresses, the more demanding users become and the more the latency threshold causing bother decreases.

This latency problem is also found in the field of virtual reality, e.g. when wearing a headset, which requires head rotation for changing the display.

To date, the solutions used for managing this latency problem have been simplistic and are not very efficient.

BRIEF SUMMARY OF THE INVENTION

The invention aims to improve the situation. To this purpose, the invention provides a computing device comprising an input human-computer interface, a controller and a display, the controller being arranged for controlling the display according to a control value measured at the input human-computer interface at a first measurement frequency. The controller comprises a differentiator and is arranged, between a first instant and a second instant separated by a duration derived from the first measurement frequency, for:

calling on the differentiator to calculate an estimate of the derivative of the control value at the second instant from the control value at the first instant and the duration derived from the first frequency, calculating a smoothing factor value at the second instant from the estimate of the first derivative of the control value at the second instant and a smoothing factor value at the first instant, calculating a display value from the control value at the first instant and a value derived from the estimate of the derivative of the control value at the second instant and the value of the smoothing factor at the second instant, and controlling the display with the display value.

This device is particularly advantageous since it makes it possible to cut out most latency problems by accurately predicting the value of the input control between two measurements, and by adapting this prediction to the situation. Indeed, the slower the movement corresponding to the input control, the weaker the perception of the latency, and the risk taken by the prediction should be minimized.

In various variants, the device according to the invention may have one or more of the following features:

the differentiator calculates the estimate of the derivative of the control value at the second instant from an estimator of the first to fifth derivatives of the control value, the differentiator executes a loop at a second frequency higher than the first frequency wherein the estimate of the derivative of the control value is updated between the first instant and the second instant by repeatedly adding to the first to fifth derivatives of the control value at the first instant a value derived from the difference between the display value at the first instant and the control value derived from the input human-computer interface at the first instant, the differentiator calculates the smoothing factor value by adding a fixed value to a multiple of the smoothing factor value at the first instant when the estimate of the first derivative of the control value at the second instant is greater than a threshold speed, and the differentiator calculates the display value by adding to the control value at the first instant the product of the estimate of the second to fourth derivatives of the control value at the second instant by an optimization vector and by the value of the smoothing factor.

The invention also relates to a method for calculating a display control comprising the measurement at a first frequency of a control value with an input human-computer interface, and, between a first instant and a second instant separated by a duration derived from the first frequency:

a. calculating an estimate of the derivative of the control value at the second instant from the control value at the first instant and the duration derived from the first frequency, b. calculating a smoothing factor value at the second instant from the estimate of the first derivative of the control value at the second instant and a smoothing factor value at the first instant, c. calculating a display value from the control value at the first instant and a value derived from the estimate of the derivative of the control value at the second instant and the value of the smoothing factor, d. controlling the display with the display value.

As a variant, the method may comprise one or more of the following operations:

operation a. comprises calculating the estimate of the derivative of the control value at the second instant from an estimate of the first to fifth derivatives of the control value, operation a. comprises the definition of the first instant as the current instant, and the repetition of the following operations, at a second frequency greater than the first frequency:

a1. defining an estimate instant by adding a duration derived from the second frequency at the current instant, a2. estimating the first to fifth derivatives of the control value at the estimate instant from their values at the current instant and the difference between the value calculated in operation c. at the first instant and the control value derived from the input human-computer interface at the first instant, a3. if the difference between the estimate instant and the first instant is less than the duration derived from the first frequency, defining the estimate instant as the current instant, and repeating operations a1. to a3., in operation b., the smoothing factor value is calculated by adding a fixed value to a multiple of the smoothing factor value at the first instant when the estimate of the first derivative of the control value at the second instant is greater than a threshold speed, operation c. calculates the display value by adding to the control value at the first instant the product of the estimate of the second to fourth derivatives of the control value at the second instant by an optimization vector and by the value of the smoothing factor.

BRIEF DESCRIPTION OF THE SEVERAL VIEWS OF THE DRAWINGS

Other features and advantages of the invention will better appear on reading the following description, derived from illustrative and non-restrictive examples, and drawings in which.

DETAILED DESCRIPTION OF THE INVENTION

The following drawings and description basically contain elements of a certain character. Therefore, they may not only serve to better understand the present invention, but also contribute to its definition, where appropriate.

The present description may involve elements that are liable to be protected by author's rights and/or copyright. The rights holder has no objection to the faithful reproduction of the present patent document or its description by anyone, as it appears in the official records. For the rest, it reserves its rights in full.

In addition, the detailed description is supplemented by Annex A, which sets out certain mathematical formulae implemented within the framework of the invention. This Annex is set apart for the purpose of clarification, and to make it easier to refer to. It is an integral part of the description, and may therefore not only serve to better understand the present invention, but also contribute to its definition, where appropriate.

Figure 1:
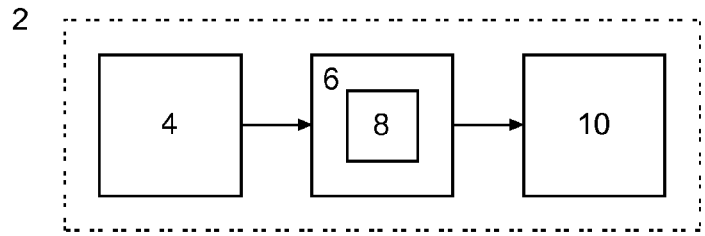
FIG. 1 represents a schematic diagram of a device according to the invention.

FIG. 1 represents a schematic diagram of a computing device 2 according to the invention. The device 2 comprises an input human-computer interface 4, connected to a controller 6 which comprises a differentiator 8 and controls a display 10.

In the example described here, the device 2 is a smart phone, whereof the touch screen serves as an input human-computer interface 4 and display 6. As a variant, the device 2 could be any other computing device, such as a tablet, a computer connected to a mouse as an input human-computer interface 4, or else a virtual reality headset comprising a tool for detecting rotations of the head as an input human-computer interface 4, etc.

In general, the controller 6 and the differentiator 8 may be implemented in the form of an appropriate computer code executed on one or more processors. Processors should be understood to mean any processor suitable for calculating positions and derivatives of these positions. Such a processor may be implemented in any known manner, in the form of a microprocessor for a personal computer, a dedicated FPGA or SoC (system on chip), a computing resource on a grid, a microcontroller, or any other form appropriate for supplying the computing power necessary to the embodiment described below. One or more of these elements may also be implemented in the form of specialized electronic circuits such as an ASIC. A combination of processor and electronic circuits may also be envisaged.

The data handled in the context of the invention may be stored on any type of data storage appropriate for receiving digital data: hard disk, solid state hard disk (SSD), flash memory in any form, random access memory, magnetic disk, storage distributed locally or in the cloud, etc. The data calculated by the device may be stored on any type of memory. This data may be deleted or saved after the device has performed its tasks.

The display 10 may be any known type of display, from electron gun screens to LCD, LED, OLED and other flat screens in all their forms.

As explained in the introduction, in a conventional device, several sources of latency accumulate between the input at the input human-computer interface and the display of the corresponding control:

the acquisition latency of the input human-computer interface 4, the communication latency between the input human-computer interface 4 and the controller 6, the latency of processing by the operating system executed by the controller 6, the processing latency of the application that interacts with the input human-computer interface 4, and the latency of the display 10.

The device 2 is different in that it uses the data from the input human-computer interface 4 for making an estimate of the control value, without worrying about performing a reconciliation between its estimation and an "actual" measurement of the control value.

In other words, the device 2 uses the controller 6 and its differentiator 8 for continuously estimating the control value and for controlling the display 10 accordingly, but it is not the data from the input human-computer interface 4 itself that defines this control. Any discrepancy between the estimate and reality is avoided by the very nature of the controller 6 and the differentiator 8, which are constructed for converging toward the measured values.

Figure 2:
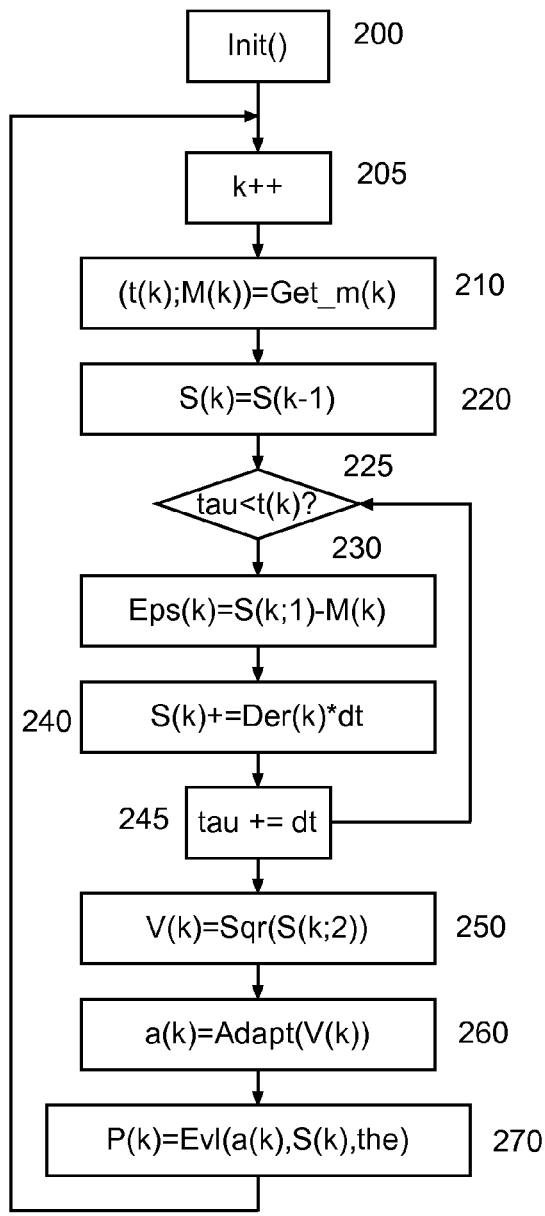
FIG. 2 represents an implementation of a display control prediction function.

FIG. 2 represents an example of a function implemented by the controller 6 for this purpose.

In an operation 200, the controller 6 initializes some of the variables of the algorithm for estimating the control value. More specifically, the time variable tau, which is the time variable that times the control of the display 10, is initialized with an initial value, for example 0. Similarly, the estimation array S is initialized with the values of the control value data measured by the input human-computer interface 4 at the time tau.

In the example described here, the array S has five rows each representing an estimate of a derivative of a control value to be estimated, and as many columns as there are control values to be estimated. For example, in the example of FIG. 1, with respect to a screen, the array S has two columns: one for the dimension x and the other for the dimension y, which will be used to track the movement of the user's finger. The rows in turn represent the derivatives of order 0 to 5 of the control value in each column, i.e. the control value and its first to the fourth derivatives. For designating the array S to the k-th iteration, the notation S(k) will be adopted, according to the formula [001] in Annex A.

At the initialization time tau, only the control value is known, so the array S(k) is initialized with the control values measured according to the formula [002] in Annex A.

In the example described here, the differentiator 8 implements a derivative estimator called HOM described in the article by W. Perruquetti, T. Floquet, and E. Moulay, *"Finite-*

*time observers: application to secure communication*", IEEE Transactions on Automatic Control, 53(1), 2008, 356-360, which defines the array S and the calculations described hereinafter. As a variant, other methods of estimating the derivative could be adopted, which would involve another form for array S and the formulae affecting it and/or using it.

Similarly, the control value of the display 10 is defined by the values of the control value data measured by the input human-computer interface 4 at the time tau, the smoothing factor a(0) is initialized to 0, and an index k is set to 0.

Then, in an operation 205, the index k is incremented. The differentiator 8 operates in a loop between two successive instants of receiving control value data measured by the input human-computer interface 4.

The loop is initialized in an operation 210 with receiving control value data measured by the input human-computer interface 4 via a function Get_m( ), which returns a time marker t(k) which corresponds to the instant of measurement and an array M(k) which comprises the control value measurements—as many as there are columns in the array S(k)—at the instant t(k). In general, the instants t(k) and t(k+1) will be separated by a fixed duration, which corresponds to the acquisition frequency of the input human-computer interface 4. As a variant, this frequency is variable.

The array S(k) is then initialized for the current loop with its last value in the previous loop in an operation 220, then the loop for estimating the derivatives is started in an operation 225, in which the value of the variable tau is compared to the time t(k) to check whether the loop must stop.

Then, in an operation 230, a variable Eps(k) is determined by comparing the first row of the array S(k) and the array M(k). The variable Eps(k) thus contains at each execution of the loop a measurement of the distance between the estimate of the control value and the last measurement of this value. This variable is used in an operation 240 which updates each column of the array S(k) on the basis of the model HOM, according to the formula [003] in Annex A. In this formula:

dt is a temporal general parameter for updating the estimator, the choice of which will be explained below, and b and 1 are optimization vectors, b contains as many columns as the array S(k), 1 has two elements, which are specific to the differentiator HOM.

For simplification, the notation of operation 230 concerning the array S(k) has been re-used, and S(k)[1,:] denotes the first row of the array S(k), S(k)[:,1] denotes the first column. Similarly, it should be understood that this notation extends to the equations:

there are as many columns as in the array S(k). The index i denotes the column of each vector. Thus, S(k)[2:4,:] represents the rows 2 to 4 of S(k), b[:,2] is the second column of b, and Eps(k)[i] and 1[i] are the corresponding elements of the vectors Eps(k) and 1.

Operation 230 amounts to discretizing the derivative of the array S(k) over a duration dt. Then tau is updated by adding dt to it in an operation 245 and the loop resumes with operation 225.

Once tau has reached the value t(k), the differentiator 8 has updated the array S(k) with its derivatives, and calculates in an operation 250 the corresponding speed, by calculating the norm of the second row of the array S(k), by a function Sqr( ) which calculates the square root of the sum of the squares of the elements of this row, it being recalled that the second row of the array S(k) contains an estimate of the first derivative.

This speed is essential since it is used for defining the value of the smoothing factor a(k) for the current loop. Indeed, according to the estimated speed of movement associated with the control, the perception of the latency by the user will be very different:

if the speed is low, then the object corresponding to the control moves only slightly, and the latency is much less perceptible—on the other hand, any estimation error will lead to a correction which will greatly bother the user, if the speed is significant, then the object corresponding to the control moves a lot, and the latency is much more perceptible—then the estimate makes sense, since it makes it possible to compensate for the bother that the latency would create.

Thus, the Applicant has found that below a threshold speed, it was useful to reduce the effect of the estimate, and increase it above. For this, in an operation 260, the differentiator 8 updates the value of the smoothing factor a(k) by executing a function Adapt( ) which applies the formula [004] in Annex A using the speed V(k) as an argument.

In this formula, g is a general parameter, the setting of which is used to proportion the intensity of the estimate according to the threshold speed V0 being exceeded, which is also a general parameter that can be set according to the application. This formula has the advantage of generating a smooth transition when the speed V(k) is close to the threshold V0. As a variant, the smoothing factor a(k) could be set differently, or even ignore the problem of transition around V0.

Finally, in an operation 270, the control value P(k) for controlling the display 10 is calculated from the measurement M0 at the time t(k), and a function Evl( ) which receives as arguments the smoothing factor a(k), the array S(k) and the optimization vector the.

The function Evl( ) applies the formula [005] from Annex A, in which S(k)[2:4,:] denotes the second to fourth rows of the array S(k), and the optimization vector the, which contains three rows and as many columns as the array S(k) and is specific to the differentiator HOM.

Thus, the control value P(k) is a vector which is calculated from the measurements of the control values from the input human-computer interface 4 added to the estimated derivative of the movement by the differentiator 8.

After operation 260, the control calculation loop for the display 10 finishes, and the loop resumes with operation 205.

In the foregoing, the time between two measurements of the input human-computer interface 4 (of the order of 1 ms for a mouse, or 8 ms for a touch screen) is much less than the latency (of the order of several tens of ms). Thus, the fact of continuously estimating the control rather than measuring it is regulated by the frequent introduction into the calculation of "actual" measurements, while avoiding all the latencies related to the processing of these measurements by a conventional device (except the latency of acquisition and that of the display).

As indicated above, the invention uses several parameters, some of which are general, and others specific to the differentiator HOM used.

Among the general parameters, the parameter dt represents an integration interval for estimating the derivative. This parameter therefore represents a compromise between the time and the computation power required and the accuracy obtained.

Empirically, the Applicant has found that a value dt equal to half the duration between two measurements of the input human-computer interface 4 offers good quality and a reasonable computation cost. This means, for example, that operations 225 to 245 will be repeated twice.

Still among the general parameters, the speed threshold V0 determines the speed from which the differentiator will weigh heavily in the estimate. Empirically, the Applicant has established that a deviation of about 10 mm (which corresponds to a perception threshold) for a duration of 70 ms (which corresponds to an average latency of conventional devices) gives a speed of 143 mm·s$^{-1}$.

Finally, the parameter g of transition above and below V0 has been set to 0.259 for the case of a duration of 1 ms between two measurements of the input human-computer interface 4, with a view to switching over 10 ms.

These parameters could be adapted according to the desired application, notably according to the duration between two measurements of the input human-computer interface 4, but also according to the incompressible latency (that related to acquisition and display) and according to the application (touch screen, virtual reality, mouse manipulation, etc.) and associated activity (fast game, immersion in a universe, surgery simulation, etc.).

The parameter the, like the parameters 1 and b, is obtained in the example described here by an optimization procedure, which is specific to each "class" of device that is optimized. This means that this optimization procedure may be performed one single time in the factory, for characterizing a plurality of devices the physical characteristics of which are identical or sufficiently similar.

This optimization procedure may, for example, be performed by defining a set of optimization measurements for the estimator, e.g. the average error, the maximum error or even the amplitude of the jitter. Then, these metrics are weighted and combined in a cost function which defines a performance measurement of the estimator. Finally, a scan of a set of possible values for the parameters is executed in order to determine the group of parameters which optimizes the cost function taking into account the set of possible values.

The choice and optimization of these values may be empirical, may be covered by particular algorithms, and especially will change with each type of estimate of the derivative used.

Among the algebraic estimators, it would be possible, for example, to use the estimates described in "*Numerical differentiation with annihilators in noisy environment*" Numerical Algorithms, vol. 50, no. 4, pp. 439-467, 2009, by M. Mboup, C. Join, and M. Fliess, or "*Algebraic parameter estimation of a multi-sinusoidal waveform signal from noisy data*" Proc. ECC 2013, pp. 1902-1907, 2013 by R. Ushirobira, W. Perruquetti, M. Mboup and M. Fliess.

Among the derivative estimators with higher order sliding modes, it would be possible to use that described in "*High-order sliding modes: differentiation and output feedback control*", Int. J. Control, vol. 76, no. 9-10, pp. 924-941, 2003 by A. Levant.

Generally, for avoiding transient states during the first instants after the start of movement, it will be preferable to display the measured positions instead of the estimated positions. The duration of the transient states depends on the device.

Optionally a post-processing step may be applied to the positions originating from the prediction step. This post-processing is aimed at reducing the noise problems that may arise under certain conditions and at path smoothing in the case of drawing tasks.

Noise reduction may be achieved through various techniques known in the literature (exponential or parabolic, moving average, weighted average). In a preferred variant, the technique described in the article by Casiez et al "*1€ Filter: A Simple Speed-based Low-pass Filter for Noisy Input in Interactive Systems*", Proceedings of the ACM Conference on Human Factors in Computing Systems (CHI '12). ACM Press, pp. 2527-2530 may be used since it offers good results for reducing noise while minimizing the perceived delay introduced.

As far as drawing tasks are concerned, the points acquired by the interactive surface and the position estimated by the prediction technique are displayed on the screen, generally by connecting these various points by consecutive segments. When compensating for a high latency or when the user performs gestures at high speed, the segment which connects the predicted point to the last acquired point may have a significant length, which introduces a visual artifact that may be bothersome. The solution to this problem is to determine different intermediate points between the last position received and that predicted. This may be done in different ways, either by determining these points for intermediate values of latency, or by using Catmull-Rom curves and more particularly those of a centripetal type.

---

Annex A $$S(k) = \begin{bmatrix} sx1(k) & sy1(k) \\ sx2(k) & sy2(k) \\ sx3(k) & sy3(k) \\ sx4(k) & sy4(k) \\ sx5(k) & sy5(k) \end{bmatrix}$$

$$S(0) = \begin{bmatrix} x(0) & y(0) \\ 0 & 0 \\ 0 & 0 \\ 0 & 0 \\ 0 & 0 \end{bmatrix}$$

$$S(k)[:, i] =$$

$$S(k)[:, i] + \begin{bmatrix} S(k)[2, i] - 5\, b[1, i] * |Eps(k)[i]|^{1+l[i]} * signe(Eps(k)[i]) \\ S(k)[3, i] - 10\, b[2, i]^2 * |Eps(k)[i]|^{1+2l[i]} * signe(Eps(k)[i]) \\ S(k)[4, i] - 10\, b[3, i]^3 * |Eps(k)[i]|^{1+3l[i]} * signe(Eps(k)[i]) \\ S(k)[5, i] - 5\, b[4, i]^4 * |Eps(k)[i]|^{1+4l[i]} * signe(Eps(k)[i]) \\ -b[5, i]^5 * |Eps(k)[i]|^{1+5l[i]} * signe(Eps(k)[i]) \end{bmatrix} * dt$$

$$a(t(k)) = a(t(k-1)) + g * \left( \begin{cases} 1 \text{ if } V(k) > Vo \\ 0 \text{ else} \end{cases} - a(t(k-1)) \right)$$

$$P(k) = M(k) + a(t(k)) * S(k)[2: 4, :] * \text{the}$$

---

The invention claimed is:

1. A computing device comprising an input human-computer interface, a controller and a display, the controller being arranged for controlling the display according to a control value measured at the input human-computer interface at a first measurement frequency, characterized in that the controller comprises a differentiator and is arranged, between a first instant and a second instant separated by a duration derived from the first measurement frequency, for:

calling on the differentiator to calculate an estimate of the derivative of the control value at the second instant from the control value at the first instant and the duration derived from the first frequency, calculating a smoothing factor value at the second instant (a(t(k))) from the estimate (V(k)) of the first derivative of the control value at the second instant and a smoothing factor value at the first instant (a(t(k−1))), calculating a display value (P(k)) from the control value at the first instant (M(k)) and a value derived from the estimate of the derivative of the control value at the second instant (S(k)) and the value of the smoothing factor at the second instant, and controlling the display with the display value (P(k)).

2. The device as claimed in claim 1, wherein the differentiator calculates the estimate of the derivative of the control value at the second instant from an estimator of the first to fifth derivatives of the control value.

3. The device as claimed in claim 2, wherein the differentiator executes a loop at a second frequency higher than the first frequency wherein the estimate of the derivative of the control value is updated between the first instant and the second instant by repeatedly adding to the first to fifth derivatives of the control value at the first instant a value derived from the difference between the display value (P(k)) at the first instant and the control value derived from the input human-computer interface at the first instant.

4. The device as claimed in claim 1, wherein the differentiator calculates the smoothing factor value by adding a fixed value to a multiple of the smoothing factor value at the first instant (a(t(k−1))) when the estimate (V(k)) of the first derivative of the control value at the second instant is greater than a threshold speed (V0).

5. The device as claimed in claim 1, wherein the differentiator calculates the display value (P(k)) by adding to the control value at the first instant (M(k)) the product of the estimate of the second to fourth derivatives of the control value at the second instant (S(k)) by an optimization vector and by the value of the smoothing factor.

6. A display control method, characterized in that it comprises the measurement at a first frequency of a control value (M) with an input human-computer interface, and, between a first instant and a second instant separated by a duration derived from the first frequency:

a. calculating an estimate of the derivative of the control value at the second instant from the control value at the first instant and the duration derived from the first frequency, b. calculating a smoothing factor value at the second instant (a(t(k))) from the estimate (V(k)) of the first derivative of the control value at the second instant and a smoothing factor value at the first instant (a(t(k−1))), c. calculating a display value (P(k)) from the control value at the first instant (M(k)) and a value derived from the estimate of the derivative of the control value at the second instant (S(k)) and the value of the smoothing factor, d. controlling the display with the display value (P(k)).

7. The method as claimed in claim 6, wherein operation a. comprises calculating the estimate of the derivative of the control value at the second instant from an estimate of the first to fifth derivatives of the control value.

8. The method as claimed in claim 7, wherein operation a. comprises the definition of the first instant as the current instant, and the repetition of the following operations, at a second frequency greater than the first frequency:

a1. defining an estimate instant by adding a duration derived from the second frequency at the current instant, a2. estimating the first to fifth derivatives of the control value at the estimate instant from their values at the current instant and the difference between the value calculated in operation c. at the first instant and the control value derived from the input human-computer interface at the first instant, a3. if the difference between the estimate instant and the first instant is less than the duration derived from the first frequency, defining the estimate instant as the current instant, and repeating operations a1. to a3.

9. The method as claimed in claim 6, wherein in operation b., the smoothing factor value is calculated by adding a fixed value to a multiple of the smoothing factor value at the first instant (a(t(k−1))) when the estimate (V(k)) of the first derivative of the control value at the second instant is greater than a threshold speed (V0).

10. The method as claimed in claim 6, wherein operation c. calculates the display value (P(k)) by adding to the control value at the first instant (M(k)) the product of the estimate of the second to fourth derivatives of the control value at the second instant (S(k)) by an optimization vector and by the value of the smoothing factor.

* * * * *